United States Patent Office 3,769,420
Patented Oct. 30, 1973

3,769,420
MASTITIS TREATMENT
Charles S. Castner, Reading, Pa., assignor to Schuyler Development Corporation
No Drawing. Filed Dec. 30, 1970, Ser. No. 102,901
Int. Cl. A61k 27/00, 21/00
U.S. Cl. 424—227   9 Claims

ABSTRACT OF THE DISCLOSURE

A method and composition for bovine teat infusion are provided based on a mixture of 60% to 90% cocoa butter fatty acids and 10% to 40% glycerine which may be suspended alone in warm water and injected into the bovine teat canals or mixed with an active antibiotic and then suspended in warm water and injected into the teat canals.

---

This invention relates to methods and compositions for teat infusion and particularly to methods and compositions treating the teats of bovine to cleanse and flush the teat canal and to relieve infection in the same.

The need for a reliable method and composition for treating stoppages and infections in bovine teat canals has long been recognized. Many methods and compositions have been proposed which are designed to carry bacteristatic materials into teat canals. Unfortunately many of these have proven to be unduly harsh and irritating or lacking in effectiveness.

The present invention relates to methods and compositions which overcome these defects of the prior art compositions.

I have found that a base composition of cocoa butter fatty acids and glycerine diluted in warm water will when injected into a bovine teat canal remove milk solids and other solids. The same composition with proper active components will act as a bacteriastat to destroy mild infections or hot infections as the case may be.

In a preferred practice of my invention I mix hydrolized cocoa butter fatty acids, glycerine and warm water and infuse the same into the teat canal by means of a polyethylene squeeze bottle having a tapered elongated nozzle. The hydrolized cocoa butter and glycerine will be primarily in the first part of the injection since they will tend to rise to the top of the water and thus be forced most deeply into the teat canal. This practice will effectively remove simple blockage of prematurely formed milk solids and other metabolic effusions which exist in the lower teat canals and prior to the symptomatic appearance of active infection or infestation. Preferably an active component designed to act on the infection or infestation is added to the base composition where such infection or infestation becomes apparent. For example, the active component may be tetracycline, sulfanilamide, sulfadiazine or any other material commonly used in treatment of infections in teat canals and mucous membranes.

The material of this invention is particularly advantageous in that it provides a sequential choice of treatment depending upon the severity of the problem. This is important because of the recognized diminishing effectiveness of repeatedly used broad-spectrum antibiotics.

Perhaps the invention can be best understood by reference to the following example. A group of cattle having udder problems was treated according to this invention. A 20% suspension of a mixture of 3 parts cocoa butter fatty acids and 1 part glycerine was formed in warm water (110° F.). This material was placed in a four ounce, flask type polyethylene bottle having a screw top with a 2.5 inch long tubular nozzle (needle tapered toward the tip) and the nozzle inserted at least 1½ inches beyond the teat orifice into the teat canal. The bottle was squeezed to force about 25% of the contents of the bottle into the teat canal. Since the cocoa butter fatty acids and glycerine float to the top of the hot water about 90% of these materials are injected into the canal by injecting 25% of the contents of the bottle. If the trouble is a simple blockage resulting from prematurely formed milk solids or the like, this composition appears to solubilize them and to clean and soothe the tissue so that the problem comes to an end.

I have found that in many cases a mixture of active components is desirable where neither one alone is satisfactory.

In the foregoing specification I have set out certain preferred practices and embodiments of my invention, however it will be understood that this invention may be otherwise practiced and embodied.

I claim:
1. A composition to be added to warm water for infusion of bovine teat canals for cleansing and flushing and for treatment of infection comprising a mixture of about 60%–90% cocoa butter fatty acids and 10% to 40% glycerine.
2. A composition as claimed in claim 1 in which about 15% to 30% of an anti-mastitis antibiotic agent is substituted for a like amount of each of the cocoa butter fatty acids and glycerine.
3. A composition as claimed in claim 1 wherein the cocoa butter fatty acids are 75% and the glycerine 25% of the composition.
4. A composition as claimed in claim 2 wherein the anti-mastitis antibiotic agent is 20% of the composition, the cocoa butter fatty acids are 60% and the glycerine 20%.
5. A method of bovine teat infusion comprising the steps of:
   (a) forming a mixture of about 60%–90% cocoa butter fatty acids and 10%–40% glycerine,
   (b) forming a suspension of said mixture in warm water and
   (c) injecting said suspension under pressure into the bovine teat canal.
6. A method of bovine teat infusion as claimed in claim 5 wherein about 15% to 30% of an anti-mastitis antibiotic agent is substituted for a like amount of each of the cocoa butter fatty acids and glycerine.
7. A method of bovine teat infusion as claimed in claim 5 wherein the cocoa butter fatty acids make up 75% of the composition and the glycerine is 25% of the composition.
8. A method of bovine teat infusion as claimed in claim 6 wherein the anti-mastitis antibiotic agent forms 20% of the mixture.
9. A method as claimed in claim 6 wherein the anti-mastitis antibiotic agent is a member selected from the group consisting of sulfadiazine, sulfanilamide, and tetracycline.

References Cited

U.S. Dispensatory, 24th ed. (1947), pp. 509 and 1203.
Klussendorf, The North American Veterinarian, May 1942, pp. 314 and 315.

SAM ROSEN, Primary Examiner

U.S. Cl. X.R.
424—228, 229, 318, 343, 365